March 25, 1952

C. JASPER ET AL 2,590,414

DUCT RODDING MACHINE

Filed March 17, 1950

INVENTORS
Cronje Jasper,
BY George T. Hawk.

March 25, 1952

C. JASPER ET AL 2,590,414

DUCT RODDING MACHINE

Filed March 17, 1950

INVENTORS.
Cronje Jasper,
BY George T. Hawk,

March 25, 1952 C. JASPER ET AL 2,590,414
DUCT RODDING MACHINE
Filed March 17, 1950 6 Sheets-Sheet 3

INVENTORS.
Cronje Jasper,
BY George T. Hawk.

March 25, 1952     C. JASPER ET AL     2,590,414
DUCT RODDING MACHINE
Filed March 17, 1950     6 Sheets-Sheet 5

INVENTORS.
Cronje Jasper,
BY George T. Hawk,

Patented Mar. 25, 1952

2,590,414

UNITED STATES PATENT OFFICE 2,590,414

DUCT RODDING MACHINE

Cronje Jasper, Villa Park, and George T. Hawk, Chicago, Ill.

Application March 17, 1950, Serial No. 150,182

18 Claims. (Cl. 175—378)

Our invention relates to the class of cable laying devices and, more specifically, is concerned with duct rodding machines for laying cable in ducts or conduits.

Duct rodding machines for threading cable in underground ducts or conduits are known, and we do not claim the same broadly.

Our improvements are concerned with the type of duct rodding machine in which fluid under pressure is utilized for effecting stepwise movement of the latter in a duct. An example of this type of duct rodding machine is disclosed in our copending application, Serial No. 787,252, filed November 20, 1947, now Patent No. 2,518,330.

According to our invention, we provide a main fluid motor unit comprising a cylinder to which is flexibly mounted at the forward end thereof a fluid operated front duct gripping unit and a piston to which is flexibly connected at the rear end thereof a fluid operated rear duct gripping unit. Both the front and rear duct gripping units have auxiliary fluid motors associated therewith for controlling gripping of the duct gripping units. The main fluid motor expands and contracts the assembly to effect a pawl and ratchet-like step progression of the entire device in the duct in which it operates.

One of the features of our present invention is the provision of a pair of vertically extending cam members, one pivotally mounted to each of the front and rear duct gripping units about an axis extending transversely thereof. When the cam members are rotated into engagement with the upper surface of the duct by means of the auxiliary fluid motors, the duct is securely gripped at the upper surface by the cam members and at the lower surface by the frame members of the front and rear duct gripping units.

Another feature of our invention is the unique manner in which the aforedescribed cam members are mounted in order that the cam members may be released quickly and positively from engagement with the duct without binding with the upper surface of the latter. The quick release of the cam members is effected by the provision of a first inclined longitudinal lost motion connection between the lower end of each of the cam members and the adjacent frames of the front and rear duct gripping units, and a second transverse lost motion connection between the intermediate portions of each of the cams and the associated parts of the auxiliary motors. The lost motion connections permit the cam members to drop away from the upper surface of the duct upon initial release movement by the auxiliary motors.

Another feature of our invention is the provision of dash pot members one adjacent each end of the cylinder of the main fluid motor unit for absorbing shock reactions of the main piston at the end of its forward and reverse stroke.

Still another feature of our invention is the disposal of the valve mechanism, for controlling fluid flow to the front and rear duct gripping units and the main fluid motor unit, within the piston of the latter, thereby conserving space and eliminating external fluid connections between the valve mechanism and the cylinder of the main fluid motor unit.

The valve mechanism comprises a valve block having suitable fluid passageways formed therein which are placed in communication with the front and rear duct gripping units and the main fluid motor unit. Disposed within a cavity formed in the valve block is a rectilinearly movable main valve for effecting connection between the desired fluid passageways and a source of fluid under pressure. Also disposed within a cavity formed in the valve block is a rectilinearly movable pilot valve for admitting fluid under pressure to opposite ends of the main valve for effecting rectilinear shifting of the latter. The pilot valve has reduced end portions that protrude outwardly at the ends of the main piston and are adapted to strike the dash pot members at the ends of the main cylinder when the main piston is at the end of its forward or reverse stroke. When one of the ends of the pilot valve strikes a dash pot member, the pilot valve is shifted to the opposite end of the cavity in which it is carried.

A feature of our valve mechanism is that by using a pilot valve to control movement of the main valve, the latter will not become stopped in an intermediate position because only full fluid pressure is admitted to the main valve by the pilot valve.

Another feature of our valve mechanism is the formation of spaced annular grooves in the peripheral walls of the cavities within which the main and pilot valves are disposed. These grooves have been provided so that the fluid under pressure flowing through the valve may exert an equal force around the periphery of the valves, thereby eliminating binding of the latter within the cavities.

Now, in order to acquaint those skilled in the art with the manner of constructing and using the device of our present invention in accordance with the principles set forth herein, we shall describe in connection with the accompanying drawings a preferred embodiment of our invention.

In the drawings:

Figure 3 is a side elevational view of the cylinder of the main fluid motor unit of the duct rodding machine of Figures 1 and 1a;

Referring now to Figures 1, 1a, 2, and 2a, there is indicated generally by the reference numeral 20 the duct rodding machine of our present invention which is particularly adapted for threading cable in underground ducts or conduits provided for housing cables or conductors.

The duct rodding machine 20 comprises a front duct gripping unit 21, a rear duct gripping unit 22, and an intermediate main fluid motor unit 23. The front and rear duct gripping units 21 and 22 are flexibly connected to the main motor unit 23 at the front and rear ends, respectively. With this arrangement, the duct rodding machine 20 is able to negotiate curves and pass over foreign matter, such as dirt or sand, which may collect in the duct or conduit.

The front duct gripping unit 21 comprises a frame member 24 having an upper transverse channel formed intermediate of the ends thereof. Suitably secured to the periphery of the rear vertical wall of the frame member 24, as by bolts 25, is a rearwardly extending cylinder 26 which has a circular plate or plug 27 secured in the rear end thereof, as by welding or equivalent means. Formed in the rear face of plug 27 are circumferentially spaced apart semispherical sockets, numbering three in the specific embodiment shown, which are adapted to receive the ball-shaped ends of parallel tie rods 28, 29, and 36. The ball-shaped ends of the tie rods 28, 29, and 36 are held within the semispherical sockets formed in the plug 27 by means of a circular cap member 30 which has circumferentially spaced apart openings 31, 32, and 35 therethrough, through which the central portions of the tie rods 28, 29, and 36 are adapted to extend. The peripheral segments of the inner ends of the openings 31, 32, and 35 are spherically formed to conform to the shape of the ends of the tie rods 28, 29, and 36. The cap member 30 is secured, as by bolts 37, or is otherwise detachably mounted to the rear surface of the plug 27. A central opening 33 is formed in the cap member 30, and a central threaded opening 34 is formed in the plug 27 which is of a smaller diameter than the opening in the cap member 30. The purpose of the openings 33 and 34 will be fully described hereinafter.

Journaled in an opening in the front vertical wall of the frame member 24 is the one end of a longitudinally extending piston rod 38 which, at its other end, extends through an opening in the rear vertical wall of the frame member 24 into the cylinder 26. Disposed within the cylinder 26 is a piston assembly, indicated by the reference numeral 39, which is mounted to the rear end of the piston rod 38 by means of a nut 40. The piston assembly 39 comprises a circular disk member 41, a circular seal 42, preferably made of leather, and a spring expander 43 for biasing the peripheral flange of the seal 42 into contact with the inner peripheral surface of the cylinder 26. The piston assembly 39 is adapted for reciprocatory motion within the cylinder 26. A cylindrical helical spring 44, of rectangular cross section, is disposed concentrically about the piston rod 38 between the rear vertical wall of the frame member 24 and the circular disk 41 of the piston assembly 39 for normally biasing the latter, and the piston rod 38, toward the rear end of the cylinder 26. The cylinder 26 and the piston assembly 39 form a first auxiliary fluid motor unit.

Disposed over the piston rod 38 between the front and rear vertical walls of the frame member 24, within the channel extending transversely thereof, is a vertically extending clevis-like cam member 45 having angularly downwardly extending spaced apart arm portions 46 and 47. Formed intermediately of each of the arm portions 46 and 47 is a slot 48. A horizontal pin 49 is inserted through a transverse opening in the piston rod 38 and the ends of pin 49 are adapted to extend into the slots 48 in the arm portions 46 and 47 of the cam member 45. Formed adjacent the outer ends of the arm portions 46 and 47 are slots 45 which extend diagonally with respect to the slots 48. Disposed through the slots 51 is a transverse pin member 52 which is mounted at its ends in horizontally spaced vertical ribs 53 and 54 of the frame member 24. The upper edge of the cam member 45 follows an arc of a circle which is eccentric to a circle having a center that coincides with the pivot point defined by the pin member 52. The upper edge of the cam member 45 is formed eccentrically so that the angle between the perpendicular and the contact point of the cam edge and a duct is the same, irrespective of the diameter of the duct (within the range of diameters for which the duct rodding machine has been designed).

Figure 1:
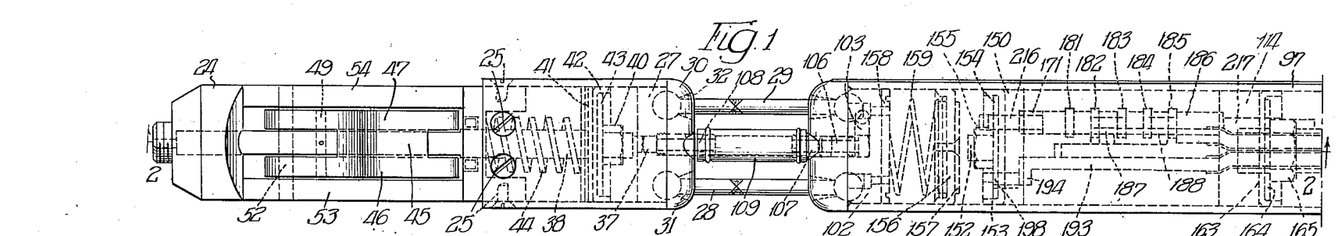
Figures 1 and 1a, together, show a plan view of the duct rodding machine of our present invention.
Figures 1A, 2A:
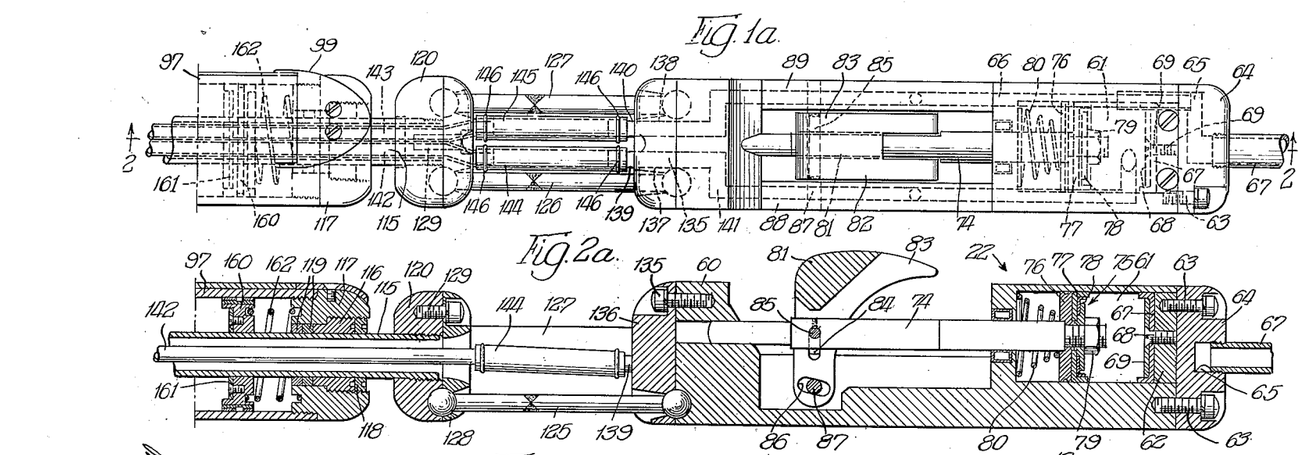
Figures 2 and 2a, together, show a vertical sectional view of the duct rodding machine of our invention taken along the line 2—2 in Figures 1 and 1a, looking in the direction indicated by the arrows.
Figure 2:
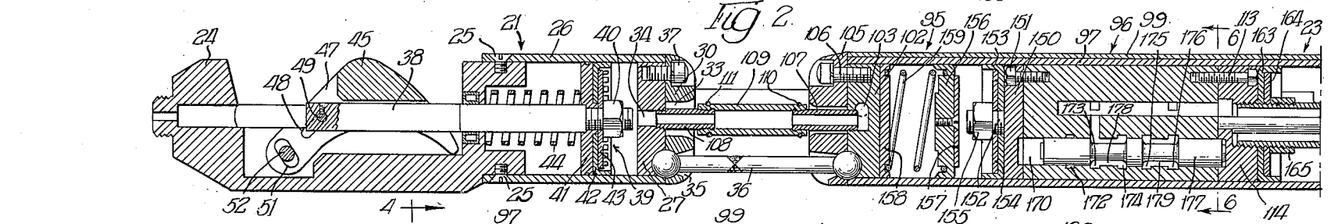

When the duct gripping unit 21 is placed in a duct or conduit, and fluid under pressure is admitted to the cylinder 26 through the opening 34 in the plug member 27, the piston assembly 39 and piston rod 38 are forced to the left, as viewed in Figures 1 and 2. Initial movement of the piston rod 38 to the left positions the pins 49 and 52 at the upper and lower ends of the slots 48 and 51, respectively. Further movement of the piston rod 38 to the left causes the ends of pin 49 to slide along the slots 48, forcing the cam member 45 to rotate counterclockwise about pin 52. Counterclockwise rotation of cam member 45 urges the upper arcuate edges thereof into engagement with the adjacent upper peripheral wall portion of the duct, thereby forcing the lower cylindrical segment of the frame member 24 against the adjacent lower peripheral portion of the duct.

Release of the duct gripping unit 21 is effected by bleeding the fluid pressure from the cylinder 26. Upon bleeding of the fluid pressure, the force of spring 44 moves the piston assembly 39 and piston rod 38 to the right, as viewed in Figures 1 and 2. Initial movement to the right of the piston rod 38 causes the slots 48 and 51 to slide downwardly about the pins 49 and 52, thereby permitting the arcuate edge of the cam member 45 to drop away from the adjacent upper peripheral wall portion of the duct. With the provision of slots 48 and 51, and pins 49 and 52, release of cam member 45 is quick and positive, thus eliminating binding between the upper arcuate edge of the cam member 45 and the adjacent peripheral wall portion of the duct.

The rear duct gripping unit 22 is similar in construction, in many respects, to the front duct gripping unit 21. The unit 22 comprises a frame member 60 having an upper transverse channel formed intermediate of the ends thereof. Suitably formed in the rear portion of the hub member 60 is a horizontal cylindrical opening or chamber 61 which has a circular plate or plug 62 secured in the rear end thereof, as by welding or equivalent means. Mounted to the rear vertical surfaces of the plug 62 and frame member 60, as by circumferentially spaced bolts 63, is a cap member 64 having an internal fluid passageway 65 which is adapted to make connection with a fluid passageway 66, formed lengthwise in the frame member 60 adjacent one side thereof, as viewed in Figures 2 and 2a, when the cap member 64 is in mounted position. The fluid passageway 65 opens outwardly centrally of the rear vertical surface of the cap member 64 and is threaded thereat to receive one end of a fluid pressure line or hose 67 which is connected at its other end to a source of fluid under pressure.

A circular seal 67, preferably of leather, is disposed within the chamber 61 in the frame member 60 and is secured to the inner face of the plug 62 by means of a bolt 68 having threaded engagement with a central opening formed in the plug 62. The bolt 68 is also utilized for the mounting of a spring expander 69 which biases the peripheral flange of the seal 67 into contact with the adjacent inner peripheral wall of the chamber 61.

Journaled in an opening in the front vertical wall of the frame member 60 is the one end of a longitudinally extending piston rod 74 which, at its other end, extends through an opening in the front vertical wall defining chamber 61. Mounted to the end of the piston rod 74, within the chamber 61, is a piston assembly, indicated at 75. The piston assembly 75 comprises a circular disk member 76, a circular seal 77, preferably of leather, and a spring expander 78 for biasing the peripheral flange of the seal 77 into contact with the adjacent inner peripheral surface of the cylindrical wall of the chamber 61. The piston assembly 75 is secured to the end of the piston rod 74 by means of a nut 79. A conical helical spring 80, of circular cross section, is disposed concentrically about the piston rod 74 between the front vertical wall of chamber 61 and the circular disk 76 of the piston assembly 75 for urging the latter and the piston rod 74 toward the rear end of the chamber 61. The chamber 61 and the piston assembly 75 form a second auxiliary fluid motor unit.

Disposed over the piston rod 74, within the channel extending transversely of the frame member 60, is a vertically extending clevis-like cam member 81, like the cam member 45 associated with the front duct gripping unit 21. The cam member 81 has downwardly extending spaced apart arm portions 82 and 83 which have slots 84 formed intermediately thereof. A horizontal pin 85 is inserted through a transverse opening in the piston rod 74 and the ends of pin 85 are adapted to be received by the slots 84 in the arm portions 82 and 83 of the cam member 81. Formed adjacent the outer ends of the arm portions 82 and 83 are slots 86 which extend diagonally with respect to the slots 84. Disposed through the slots 86 is a transverse pin 87 which is mounted at its ends in horizontally spaced apart vertical ribs 88 and 89 of the hub member 60. The upper edge of the cam member 81 is formed eccentrically for the same reasons as the afore-described cam member 45.

The operation of the rear duct gripping unit 22 is the same as the operation of the front duct gripping unit 21. That is, when fluid is admitted under pressure to the chamber 61, the piston assembly 75 and piston rod 74 are forced to the left, as viewed in Figures 1, 1a, 2, and 2a. Initial movement of the piston rod 74 to the left positions the pins 85 and 87 at the upper and lower ends of the slots 84 and 86, respectively. Further movement of the piston rod 74 to the left causes the ends of the pin 85 to slide along the slot 84, forcing the cam member 81 to rotate counter-clockwise about pin 87. If the rear duct gripping unit 22 is placed within a duct or conduit, counterclockwise rotation of cam member 81 urges the upper arcuate edges thereof into engagement with the adjacent upper peripheral portion of the duct, thereby forcing the lower cylindrical segment of the hub member 60 against the lower portion of the duct.

Release of the duct gripping unit 22 is effected by bleeding the fluid pressure from the chamber 61 which permits the spring 80 to expand. Expansion of spring 80 moves the piston assembly 75 and piston rod 74 to the right, as viewed in Figures 1, 1a, 2 and 2a. Initial movement to the right of the piston rod 74 causes the slots 84 and 86 to slide downwardly about the pins 85 and 87, thereby permitting the arcuate upper edge of the cam member 81 to drop away from the adjacent upper peripheral wall portion of the duct. With the provision of slots 84 and 86, and pins 85 and 87, the release of cam member 81, like the release of the cam member 45, is quick and positive, thus eliminating binding between the upper arcuate edge of the cam member 81 and the adjacent upper peripheral wall portion of the duct.

The main fluid motor unit, indicated generally at 23, which is disposed between the front duct gripping unit 21 and the rear duct gripping unit 22, comprises a master cylinder unit 95 flexibly connected to the rear end of the front duct gripping unit 21 and a master piston assembly, indicated at 96, flexibly connected to the front end of the rear duct gripping unit 22.

Figure 3:
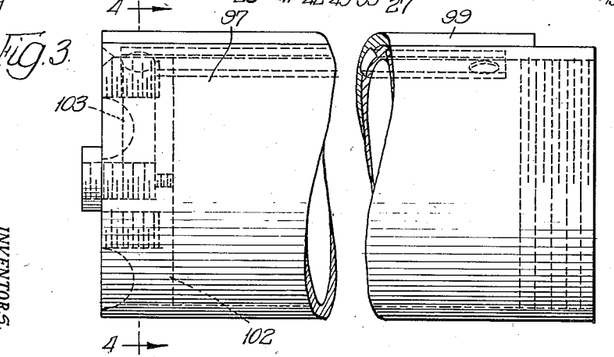
Figure 4:
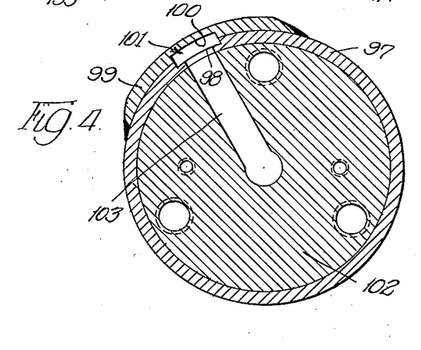
Figure 4 is a vertical sectional view of the cylinder of Figure 3 taken along the line 4—4, looking in the direction indicated by the arrows.

The master cylinder unit 95 comprises a cylinder 97 having a longitudinally extending groove 98 formed in the outer peripheral surface thereof, offset to one side of a vertical plane passing through the axis of the cylinder 97, as best shown in Figures 3 and 4. An arcuate plate member 99 is suitably secured, as by welding, to the outer peripheral surface of the cylinder 97. Formed along the inner peripheral surface of the arcuate plate member 99 is a lengthwise extending groove 100 which is adapted to mate with the groove 98 in the cylinder 97. When the arcuate plate member 99 is in assembled position, the grooves 98 and 100 define a fluid passageway 101 extending longitudinally of the master cylinder unit 95. The fluid passageway 101 opens at its one end into the cylinder 97 adjacent the rear end thereof. A circular end member 102 is suitably secured, as by welding, in the forward end of the cylinder 97. The end member 102 has a radially directed fluid passageway 103 formed internally therein which, at its outer end, is adapted to connect with the forward end of the fluid passageway 101 and at its inner end is adapted to open outwardly centrally of the end member 102.

Threaded into the central opening of the end member 102 and extending forwardly therefrom, as shown in Figures 1, 1a, 2 and 2a, is a pipe stud 107 having an annular bead portion formed adjacent its outer end. Threaded into the central opening in the plug member 27 and extending through the central opening 33 in the cap member 30 of the front duct gripping unit 21 is a pipe stud member 108 which is similar in form to the pipe stud 107. Interconnecting the outer ends of each of the stud members 107 and 108 is a sleeve member 109 which is maintained in position by means of a pair of spaced annular ring members 110 and 111, which are disposed coaxially about the periphery of the sleeve member 109, inwardly of the shoulder portions formed by the annular beads adjacent the outer ends of the pipe studs 107 and 108, respectively. A fluid connection is thus effected between the rear end of the main cylinder unit 95 of the main fluid motor unit 20 and the cylinder 26 of the front duct gripping unit 21 through fluid passageway 101 extending longitudinally of the cylinder 97, fluid passageway 103 extending radially in the end member 102, pipe stud 107, flexible sleeve member 109, and pipe stud 108.

In the outwardly facing surface of the end member 102 are a number of semispherical sockets which number three in the specific embodiment illustrated herein. These sockets are adapted to receive the enlarged ball-shaped ends of the tie rods 28, 29, and 36 which extend rearwardly from the front duct gripping unit 21. The ball-shaped ends of the tie rods 28, 29, and 36 are adapted to be held within the semispherical sockets of end member 102 by means of a cap member 105 having circumferentially spaced openings therethrough, through which the central portions of the tie rods 28, 29, and 36 are adapted to extend. The inner ends of the openings in the cap member 105 are semispherical segments, thus corresponding to the shape of the ends of the tie rods 28, 29, and 36. The cap member 105 has a central opening through which pipe stud 107 extends and is secured to the end member 102 by means of circumferentially spaced bolts 106. In order to facilitate the assembly of the cap members 30 and 105 about the tie rods 28, 29, and 36, the latter are fabricated in two parts and then welded together after the reduced ends of the parts have been inserted through the openings in the cap members 30 and 105.

From the foregoing description, it will be apparent that the front end of the master cylinder unit 95 is flexibly connected through the tie rods 28, 29, and 36 to the rear end of the front duct gripping unit 21. That is, since the tie rods 28, 29, and 36 are mounted to the rear end of the front duct gripping unit 21 in a manner which permits limited relative movement, and since the other ends of the tie rods 28, 29, and 30 are similarly connected to the forward end of the master cylinder unit 95 in a manner permitting limited relative movement, this construction, in effect, permits limited relative lateral movement between the master cylinder unit 95 and the front duct gripping unit 21.

The main piston assembly 96 disposed within the cylinder 97 of the main fluid motor unit 23 comprises a valve block 112, the details of which will be described more fully hereinafter. Secured to the rear end of the valve block 112 by means of a plurality of circumferentially spaced bolts 113 is an end block 114 having a central opening formed therein which is partially threaded for receiving the threaded end of a tubular piston rod 115 extending rearwardly therefrom. The tubular piston rod 115 is journaled intermediate of its end in a bushing member 116 threaded into a central opening formed in a cap member 117 which, in turn, is threaded into the end of the cylinder 97 of the main cylinder unit 95. The bushing member 116 is held within the cap member 117 by means of a lock ring 118. Seal members 119 are provided between the inner peripheral surface of the cap member 117, adjacent the inner end thereof and the adjacent outer peripheral surface of the piston rod 115, for minimizing the escape of fluid under pressure from the cylinder 97.

The outer end of the tubular piston rod 115 is threaded into a central opening formed in a block member 120. The block member 120 has formed in its rear vertical surface circumferentially spaced semispherical sockets which are adapted to receive the enlarged ball-shaped ends of tie rods 125, 126, and 127. The tie rods 125, 126, and 127 are held within the sockets formed in the base member 120 by means of a cap member 128, which has circumferentially spaced openings formed therethrough, through which the central portions of the tie rods 125, 126, and 127 are adapted to extend. The inner ends of the openings in the cap member 128 are spherical segments and are adapted to cooperate with the ball-shaped ends of the tie rods 125, 126, and 127. The cap member 128 is secured to the base member 120 by means of a plurality of circumferentially spaced bolts 129. The ends of the tie rods 125, 126, and 127, opposite the ends secured to the base member 120, are adapted to be received in circumferentially spaced semispherical sockets formed in the frame member 60. The ball-shaped ends of the tie rods 125, 126, and 127 are held within the sockets formed in the frame member 60 by means of a cap member 136, which has circumferentially spaced opening formed therethrough, through which the central portions of the tie rods 125, 126, and 127 are adapted to extend. The openings in the cap member 136, like the openings in the cap member 128, are formed semispherically at their inner ends for cooperation with the associated ball-shaped ends of tie rods 125, 126, and 127. The cap member 136 is mounted to the front end of the frame member 60 by means of circumferentially spaced bolts 135. The tie rods 125, 126, and 127 are fabricated in two parts and after the reduced ends of the parts have been inserted through the openings in the cap members 128 and 136, the respective halves are welded together. The tie rods 125, 126, and 127 permit limited relative movement to take place between the rear duct gripping unit 22 and the piston assembly 96 of the main fluid motor unit 23.

The cap member 136, which is secured to the forward end of the frame member 60 of the rear duct gripping unit 22, is provided with a pair of horizontally spaced apart openings 137 and 138 in which a pair of pipe studs 139 and 140 are disposed, respectively. The opening 138 in the cap member 136 is connected with the longitudinally extending fluid passageway 66 formed in the frame member 60. The opening 137 in the cap member 136 is connected with a longitudinally extending fluid passageway 141 which is formed in the frame member 60 on the opposite side thereof as the fluid passageway 66. The fluid passageway 141 at its rear end opens inwardly into the chamber 61 of the frame member 60. A pair of tubes 142 and 143 are disposed within the tubular piston rod 115 of the main fluid motor unit 23. The tubes 142 and 143, at their one ends, are connected to the pipe studs 139 and 140, carried by the cap member 136, by means of flexible sleeve members 144 and 145 which are fastened at their ends by means of retaining rings 146. From the above description, it will be observed that the tube member 143 is placed in communication with the fluid pressure hose 67 by means of the flexible sleeve member 145, pipe stud 140, fluid passageway 66 in the frame member 60 of the rear duct gripping unit 22, and the fluid passageway 65 in the rear cap member 64. The other tube member 142 has communication with the chamber 61 of the rear duct gripping unit 22 through the flexible sleeve member 144, pipe stud 139, and the fluid passageway 141 in the hub member 60 of the rear duct gripping unit 22. The other ends of the tubes 142 and 143 are connected to the valve block 112 in a manner which will be described in detail hereinafter.

Mounted to the forward end of the valve block 112 is a circular disk 150 which is secured thereto by means of a plurality of circumferentially spaced bolts 151. Formed integrally with the plate member 150 is a centrally located forwardly extending threaded cylindrical portion 152. Disposed over the threaded portion 152, in juxtaposition of the plate member 150, is a seal 153, preferably formed of leather. A metal expander 154 is disposed over the threaded cylinder 152 and is adapted to press the peripheral flanges of the seal 153 into contact with the adjacent peripheral walls of the cylinder 97. The seal 153 and spring expander 154 are held in position by means of a nut 155.

A dash pot member 156 is disposed within the cylinder 97 adjacent the forward end thereof and is provided with a striker plate 157, against which the main piston assembly 96 is adapted to strike at the extreme end of its forward stroke. A spring retaining member 158 is disposed within the cylinder 97 adjacent the end member 102 and is adapted to provide for the support of a coil spring disposed between the member 158 and the dash pot member 156 for normally urging it to the right. The spring 159 is adapted to cushion the shock reactions imparted to the dash pot member 156 when the piston assembly 96 strikes the latter.

A second dash pot member 160 is disposed adjacent the rear end of the cylinder 97 and is provided with a striker plate 161, against which the rear end of the piston assembly 96 is adapted to strike when in the extreme rear position. A spring 162 is disposed between the dash pot member 160 and the cap member 117 for cushioning the shock reactions imparted to the dash pot member 160 by the piston assembly 96.

To further reduce the escape of fluid under pressure from the valve block 112, a seal is disposed about the tubular piston rod 115 in juxtaposition of the rear surface of the end member 114. The seal 163 is preferably formed of leather, and the peripheral flanges thereof are maintained in contact with the adjacent peripheral walls of the cylinder 97 by means of a metal expander 164 which is held in position by means of a nut 165 threaded on the end of the tubular piston rod 115.

Figure 5:
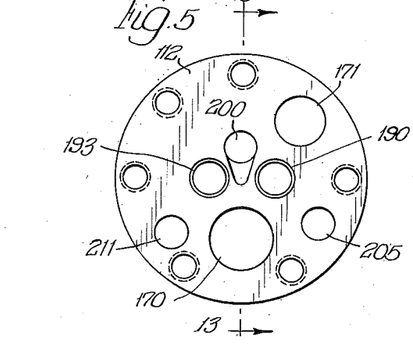
Figure 5 is an end view of the valve block which comprises the piston of the main fluid motor unit of the duct rodding machine of Figure 1.
Figure 6:
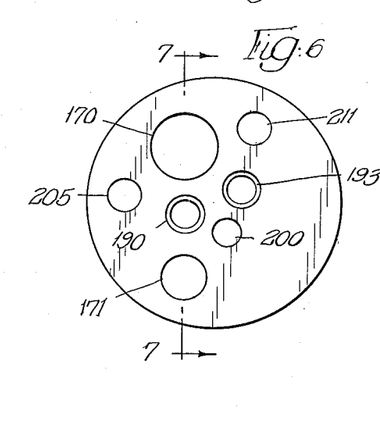
Figure 6 is an end view of the valve block which has been rotated about its longitudinally extending central axis from the position shown in Figure 5.

The valve block 112 has a pair of longitudinally extending parallel spaced apart openings or cavities 170 and 171 formed therethrough. The axis of the opening 170 lies in the vertical median plane of the valve block 112 below the horizontal median plane thereof, as shown in Figure 5. The axis of the opening 171 lies above the horizontal median plane of the valve block 112, at one side of the vertical median plane thereof. Formed in the periphery of the opening or cavity 170 are spaced apart annular grooves 172, 173, 174, 175, and 176. A main valve member 177 is disposed within the opening 170 and is adapted for reciprocating motion therein. A pair of spaced annular channels 178 and 179 are formed in the valve member 177, and the channels 178 and 179 each are adapted to interconnect one pair of the annular grooves formed in the peripheral wall of the opening 170, depending on the position of the main valve 177. Formed in the peripheral wall of the opening or cavity 171 in the valve block 112 are spaced apart annular grooves 181, 182, 183, 184, and 185. Disposed within the opening 171 is a pilot valve member 186 which is adapted for reciprocating motion therein. A pilot valve is provided for controlling the shifting of the main valve in order to prevent the latter from becoming stopped in an intermediate position. With the use of a pilot valve, only full fluid pressure is admitted to the ends of the main valve, in a manner which will be fully described hereinafter. The admission of full fluid pressure to the ends of the main valve always effects a complete shift of the latter. A pair of spaced annular channels 187 and 188 are formed in the outer periphery of the valve member 186, and the channel members 187 and 188 each are adapted to interconnect a pair of the annular grooves formed in the peripheral wall of the opening 171, depending on the position of the pilot valve 186. By the provision of the annular grooves in the periphery of the openings 170 and 171 in the valve block 112 and the annular channels in the valves 177 and 186, fluid circulating about the valves 177 and 186 exerts an equal pressure around the entire periphery of the valves 177 and 186, thus eliminating binding of the latter during rectilinear movement within the openings 170 and 171, respectively.

Figure 7:
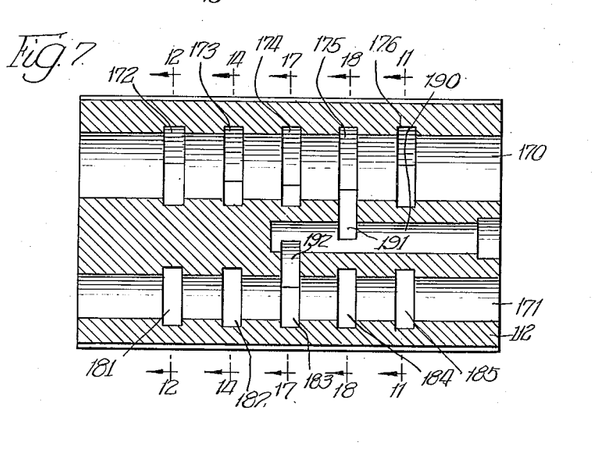
Figure 7 is a lengthwise vertical sectional view of the valve block taken along the line 7—7 in Figure 6, looking in the direction indicated by the arrows.

The tube 143 which, as explained previously, has connection at its one end with a source of fluid under pressure, is carried within the tubular piston rod 115 and has connection at its other end with a longitudinally extending fluid passageway 190 formed in the valve block 112. The axis of the fluid passageway 190 coincides with the horizontal median plane of the valve block 112 at one side of the vertical median plane thereof, as shown in Figure 5. As best shown in Figure 7, the fluid passageway 190 terminates intermediate of the ends of the valve block 112. Interconnecting the fluid passageway 190 intermediate of the ends thereof and the annular groove 175 in the peripheral wall of the opening 170 is a diagonal fluid passageway 191 lying in a plane extending transversely of the valve block 112. Interconnecting the fluid passageway 190, adjacent the inner end thereof, and the annular groove 183 in the peripheral wall of the opening 171 is a diagonal fluid passageway 192 lying in a plane parallel to the fluid passageway 191.

Figures 8, 9:
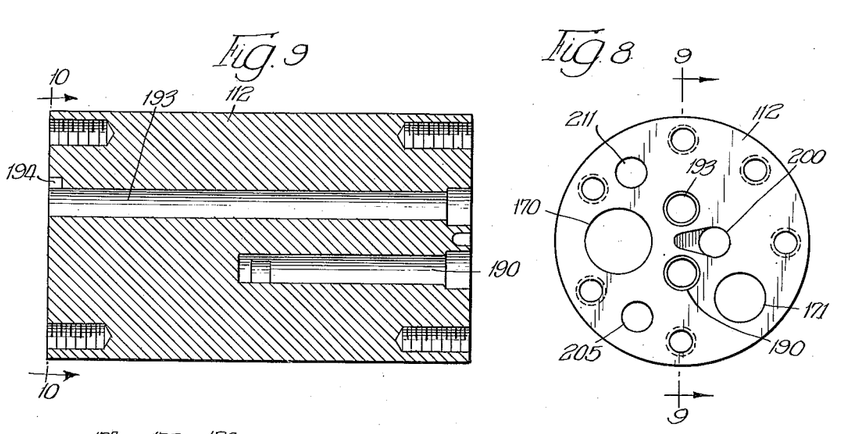
Figure 8 is an end view of the valve block which has been rotated about its longitudinally extending central axis from the position shown in Figure 5.
Figure 9 is a lengthwise vertical sectional view of the valve block taken along the line 9—9 in Figure 8, looking in the direction indicated by the arrows.
Figure 10:
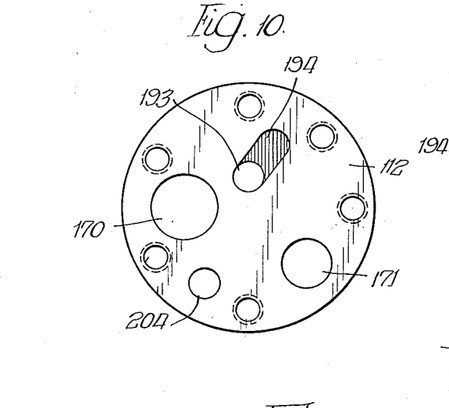
Figure 10 is an end view of the valve block taken along the line 10—10 in Figure 9, looking in the direction indicated by the arrows.
Figure 11:
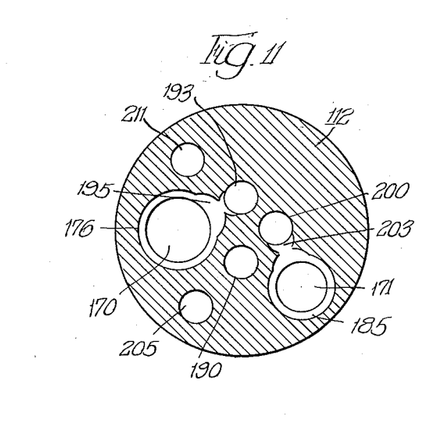
Figure 11 is a vertical transverse sectional view of the valve block taken along the line 11—11 in Figure 7, looking in the direction indicated by the arrows.
Figure 12:
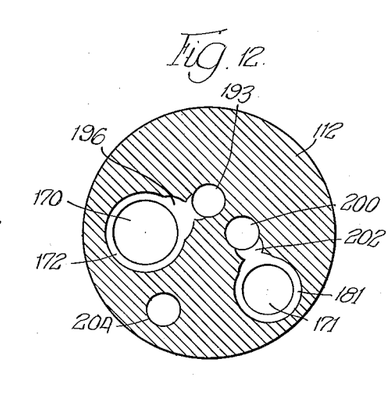
Figure 12 is a vertical transverse sectional view of the valve block taken along the line 12—12 in Figure 7, looking in the direction indicated by the arrows.

The tube 142, which, as explained previously, has connection at its one end to the chamber 61 of the rear duct gripping unit 22, is carried within the tubular piston rod 115 parallel to tube 143 and has connection at its other end with a longitudinally extending fluid passageway 193 formed in the valve block 112. The axis of the fluid passageway 193 lies in the horizontal median plane of the valve block 112 on the opposite side of the vertical median plane thereof as the fluid passageway 190. As best shown in Figure 9, the fluid passageway 193 extends through the valve block 112. Interconnecting the fluid passageway 193 and the annular groove 176 in the peripheral wall of the opening 170, as shown in Figure 11, is a diagonal fluid passageway 195 lying in a plane extending transversely of the valve block 112. The fluid passageway 193 is also interconnected with the annular groove 172 in the peripheral wall of opening 170, as shown in Figure 12, by a diagonal fluid passageway 196 lying in a plane parallel to the fluid passageway 195. As shown in Figure 10, a channel 194 having connection with fluid passageway 193 is formed in the end of the valve block 112. The channel 194 has connection at its outer end with a mating channel 197 formed in the plate member 159, as shown in Figure 19, which channel 197 connects with a passageway 198 opening into the cylinder 97 at the forward end of the piston assembly 96.

Figure 13:
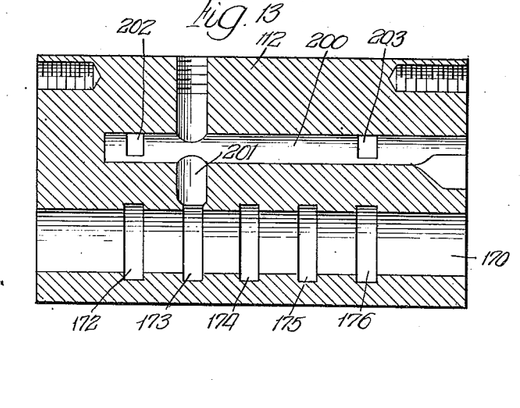
Figure 13 is a lengthwise sectional view of the valve block taken along the line 13—13 in Figure 5, looking in the direction indicated by the arrows.
Figure 14:
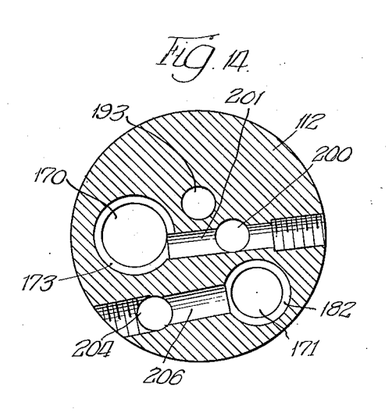
Figure 14 is a vertical transverse sectional view of the valve block taken along the line 14—14 in Figure 7, looking in the direction indicated by the arrows.
Figure 15:
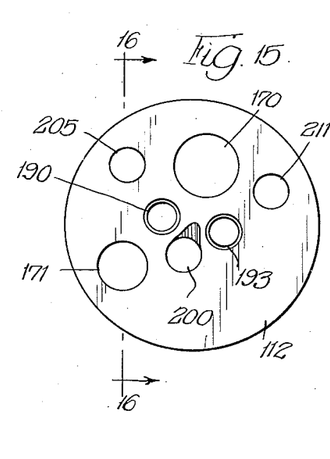
Figure 15 is an end view of the valve block which has been rotated about its longitudinally extending central axis from the position shown in Figure 5.

A longitudinally extending fluid passageway 200 is formed in the valve block 112. The fluid passageway 200 opens at its outer end into the tubular piston rod 115. The axis of the fluid passageway 200 lies in the vertical median plane of the valve block 112 above the horizontal median plane thereof. Interconnecting the fluid passageway 200 and the annular groove 173 in the peripheral wall of the opening 170, as best shown in Figures 13 and 14, is a diagonal fluid passageway 201 lying in a transverse plane of the valve block 112. Interconnecting the fluid passageway 200 adjacent its one end and the annular groove 181 in the peripheral wall of the opening 171 is a diagonal fluid passageway 202, which lies in a transverse plane parallel to the fluid passageway 201. The fluid passageway 200 is also connected with the annular groove 185 in the peripheral wall of the opening 171 by means of a fluid passageway 203, which lies in a transverse plane parallel to the fluid passageways 201 and 202.

Figure 16:
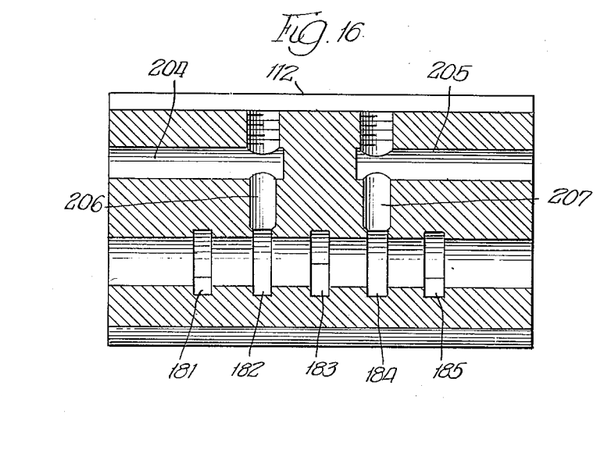
Figure 16 is a lengthwise sectional view of the valve block taken along the line 16—16 in Figure 15, looking in the direction indicated by the arrows.

A pair of coaxially aligned longitudinally extending fluid passageways 204 and 205 are formed inwardly of the opposite ends of the valve block 112 below the horizontal median plane thereof, and to one side of the vertical median plane, as shown in Figure 5. Fluid passageway 204 at its inner end is connected to the annular groove 182 in the peripheral wall of the opening 171 by means of a diagonal fluid passageway 206 which lies in a transverse plane of the valve block 112, as shown in Figures 14 and 16. Fluid passageway 205 at its inner end is connected to the annular groove 184 in the peripheral wall of the opening 171 by means of a diagonal fluid passageway 207 which lies in a transverse plane parallel to the fluid passageway 206, as shown in Figures 16 and 18.

Figures 17, 18, 19, 20, 21, 22, 23, 24:
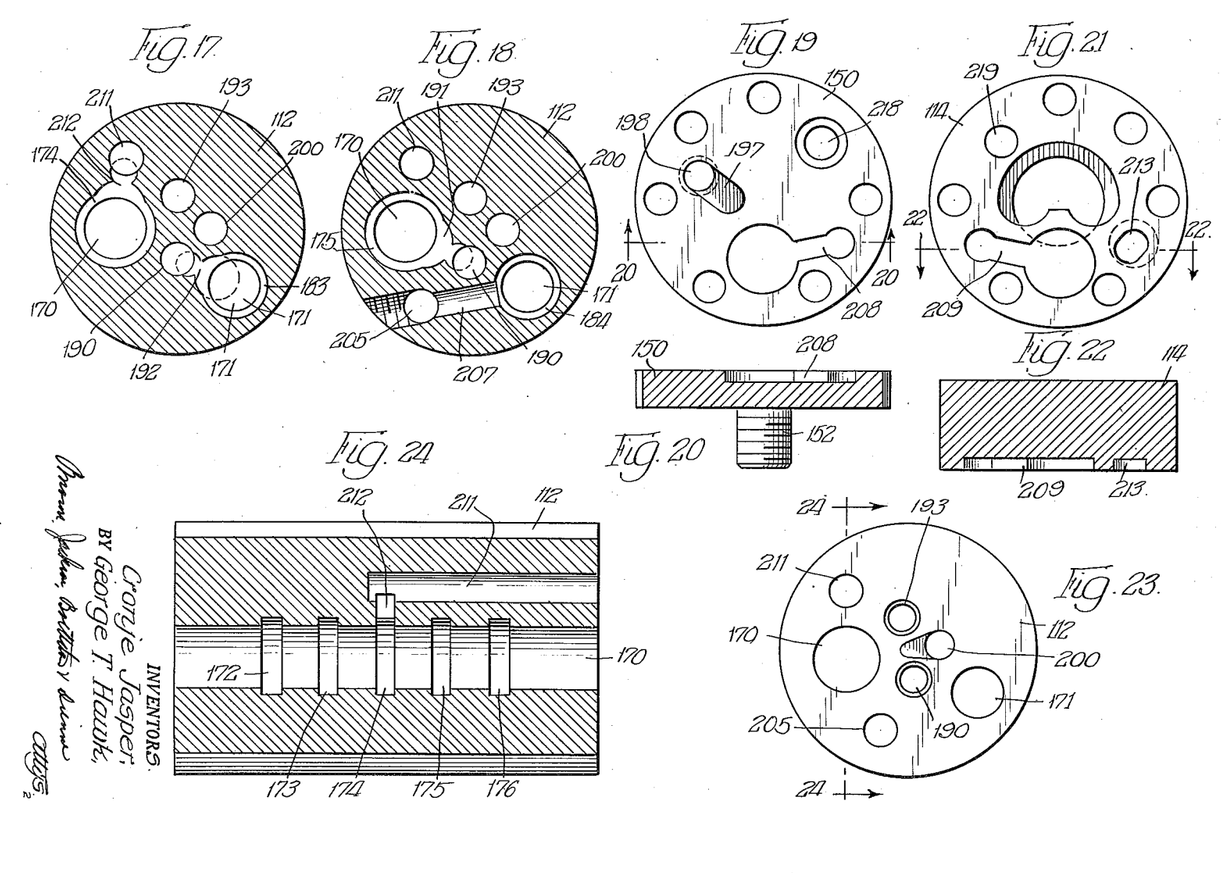
Figure 17 is a vertical transverse sectional view of the valve block taken along the line 17—17 in Figure 7, looking in the direction indicated by the arrows.
Figure 18 is a vertical transverse sectional view of the valve block taken along the line 18—18 in Figure 7, looking in the direction indicated by the arrows.
Figure 19 is an end view of a plate member which is secured to the one end of the valve block.
Figure 20 is a horizontal sectional view of the end member shown in Figure 19 taken along the line 20—20 in Figure 19, looking in the direction indicated by the arrows.
Figure 21 is an end view of an end block which is secured to the opposite end of the valve block as is the plate member shown in Figures 19 and 20.
Figure 22 is a horizontal sectional view of the end block shown in Figure 21 taken along the line 22—22 in Figure 21, looking in the direction indicated by the arrows.
Figure 23 is an end view of the valve block which has been rotated about its longitudinally extending central axis from the position shown in Figure 5.
Figure 24 is a lengthwise sectional view of the valve block taken along the line 24—24 in Figure 23, looking in the direction indicated by the arrows.

The fluid passageway 204 at its outer end connects with the adjacent end of opening 170 through a shallow key hole shaped channel 208 formed in the plate member 150, as shown in Figures 19 and 20. The fluid passageway 205 at its outer end connects with the adjacent end of opening 170 through a shallow key hole shaped channel 209 formed in the end block 114, as shown in Figures 21 and 22.

A longitudinally extending fluid passageway 211 is formed in the valve block 112 and the axis of the passageway lies below the horizontal median plane of valve block 112 on the opposite side of the vertical median plane as the fluid passageways 204 and 205, as shown in Figure 5. As best shown in Figure 24, the fluid passageway 211 terminates intermediately of the ends of the valve block 112 and is connected at its inner end to the annular groove 174 in the peripheral wall of the opening 170 by a diagonal fluid passageway 212 which lies in a transverse plane of the valve block 112. The outer end of the fluid passageway 211 connects with an opening 213, formed in the end block 114, seal 163, and spring retainer 164, which communicates with the cylinder 97 at the rear of the piston assembly 96.

The pilot valve 186 is provided with reduced end portions 216 and 217. The end 216 extends through the opening 218 formed in the plate member 150, seal 153, and spring retainer 154, and is adapted to engage the face plate 157 of the dash pot member 156 when the piston assembly 96 is at the extreme end of its forward stroke within the cylinder 97. The end 217 extends through the opening 219 in the end block 114, seal 163, and spring retainer 164, and is adapted to engage the striker plate 161 of the dash pot member 160 when the piston assembly 96 is at the extreme end of its rearward stroke within the cylinder 97.

The main valve 177 is provided with reduced end portions 220 and 221 which are adapted to engage the enlarged ends of the key hole channels 208 and 209 in the members 150 and 114, respectively. The reduced end portions 220 and 221 are provided in order that fluid under pressure may be directed to the ends of the main valve 177 for shifting the latter rectilinearly.

Referring now to Figures 1, 1a, 2, 2a, 25, and 26, we shall describe the operation of the duct rodding machine of our present invention. After the duct rodding machine has been placed within a duct or conduit, fluid under pressure is admitted to the fluid passageway 65 in the rear cap member 64 of the rear duct gripping unit 22 through the hose line 67. The fluid under pressure then flows through the fluid passageway 65 in the cap member 64 to the longitudinally extending fluid passageway 66 formed in the frame member 60 of the rear duct gripping unit 22. The fluid continues from the passageway 66 to the opening 138 in the front cap member 136 of the rear duct gripping unit 22. From the opening 138 the fluid passes through pipe stud 140, flexible sleeve member 147, and hence through the tube 143 carried in the tubular piston rod 115 to the fluid passageway 190 in the valve block 112.

Figure 25:
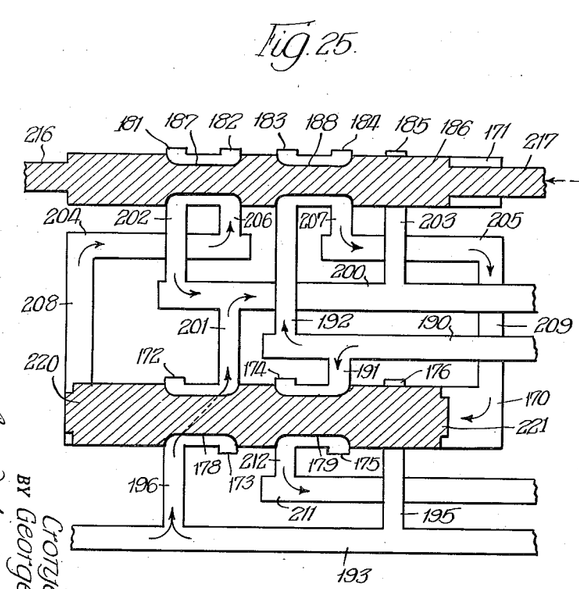
Figure 25 is a schematic diagram of the fluid passageways formed in the valve block showing the valves in one of their positions.

Following the schematic diagram shown in Figure 25, it will be observed that with the valve 186 in the position shown, the fluid passageways 192 and 207 are placed in communication by means of the channel 188 in the pilot valve 186, thus permitting the fluid under pressure to flow from inlet fluid passageway 190, through passageway 192, channel 188, passageway 207, passageway 205, channel 209 to the end of the main valve 177. When the main valve 177 is positioned to the left, fluid passageways 191 and 212 are placed into communication by means of channel 179 in the main valve 177, thus allowing the fluid under pressure to flow from the passageway 190 through the passageway 191, channel 179, passageway 212, and passageway 211 into the main cylinder 97 at the rear of the main piston assembly 96 of the main fluid motor unit 20. The fluid entering the cylinder 97 exerts a force on the rear end of the piston assembly 96 and the assembly 96 is pushed forward within the cylinder 97. Carried forward with the piston assembly 96 is the tubular piston rod 115 and the rear duct gripping unit 22 flexibly mounted to the rear end of the latter.

Fluid entering the cylinder 97 is also transmitted to the longitudinally extending fluid passageway 101 formed along the outer periphery of the cylinder 97, as shown in Figures 3 and 4. From the passageway 101 the fluid flows through passageway 103 in the end member 102 at the forward end of cylinder 97, pipe stud 107, flexible sleeve member 109, pipe stud 108, opening 34 in the plug member 27, and hence into the cylinder 26 of the front duct gripping unit 21. The fluid entering the cylinder 26 urges the piston assembly 39, together with the piston rod 38, to the left, thereby extending the cam member 45 into duct gripping position.

Also, while the pilot valve 186 is in the position shown in Figure 25, the channel 187 formed therein interconnects the fluid passageways 202 and 206 and fluid is bled from the other end of the main valve 177 through channel 208 in the plate member 150, passageways 204 and 206, channel 187, passageway 202, and passageway 200. From the passageway 200 the fluid is discharged into one end of the tubular piston rod 115 which, at its other end, is open to the atmosphere. Simultaneously, the chamber 61 of the rear duct gripping unit 22 is bled by placing it in communication with the exhaust passageway 200 through the longitudinal fluid passageway 141 formed in the frame member 60, opening 137 in the front cap member 136, pipe stud 139, flexible sleeve member 144, tube 142 carried in the tubular piston rod 115, and the fluid passageway 193 in the valve block 112. The fluid passageway 193 communicates with passageway 196 which is connected to the passageway 201 through the channel 178 of the main valve 177. The passageway 201 is connected with the exhaust passageway 200 which, as described previously, opens into the tubular piston rod 115 and hence into the atmosphere.

When the chamber 61 in the rear duct gripping unit 22 is bled, the spring 80 urges the piston assembly 75 to the right, thereby maintaining the cam member 81 in its retracted position. It will be observed that while the chamber 61 is being bled through fluid passageway 193, the front end of the main cylinder 97 is also being bled as the one end of the fluid passageway 193 opens into the forward end of cylinder 97.

The operations of bleeding the forward end of main cylinder 97 and chamber 61 in the rear duct gripping unit 22, and admitting fluid under pressure to the forward duct gripping unit 21 and the rear end of the main cylinder 97, takes place substantially simultaneously.

Figure 26:
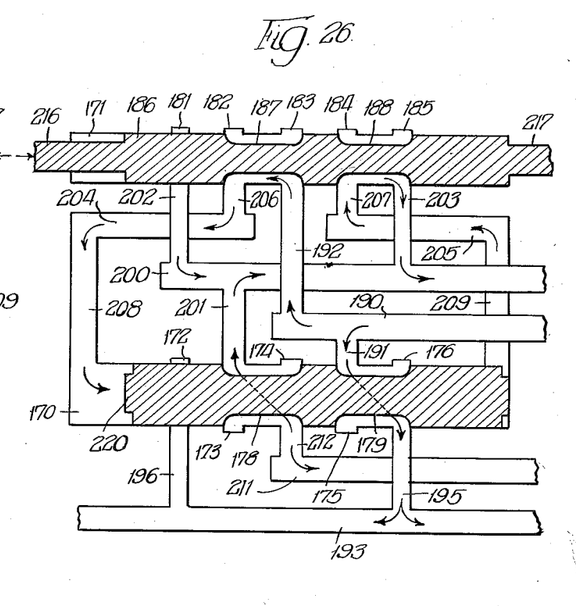
Figure 26 is a schematic diagram of the fluid passageways formed in the valve block showing the valves in the other of their positions.

When the main piston assembly 96 reaches the extremity of its forward stroke within the main cylinder 97, the reduced end 216 of the pilot valve 186 strikes the face plate 157 of the dash pot member 156 and the pilot valve 186 is shifted to the right, from the position shown in Figure 25 to the position shown in Figure 26. With the pilot valve 186 in this position, fluid is bled from the right end of the opening 170 through channel 209 in the end block 114, fluid passageways 205 and 207, channel 188 in the pilot valve 186, fluid passageway 203, and fluid passageway 200 which, as mentioned before, opens into the tubular piston rod 115.

Simultaneously, while the right end of opening 170 is bled, fluid under pressure is directed into the left end of opening 170, thereby shifting the main valve 177 to the right to the position shown in Figure 26. Fluid under pressure is transmitted to the left end of opening 170 from the passageway 190 by means of passageway 192, channel 187 in the pilot valve 186, passageways 206 and 204, and channel 208 formed in the end member 150. The passageway 190, as described above, is connected with a source of fluid under pressure through tube 143 in the tubular piston rod 115, flexible sleeve 145, pipe stud 140, opening 138 in the front cap member 136 of the rear duct gripping unit 22, longitudinal fluid passageway 66 in the frame member 60, passageway 65 in the rear cap member 64, and the inlet hose 67.

With the main valve 177 shifted to the right, the fluid is bled from the cylinder 26 of the front duct gripping unit 21 through opening 34 in the plug 27, pipe stud 108, flexible sleeve 109, pipe stud 107, passageway 103 in the end member 102, and the longitudinally extending passageway 191 of the main cylinder 97. The fluid is further bled from the passageway 101 and the rear end of the main cylinder 97 by means of the fluid passageways 211 and 212, channel 178 in the main valve 177, passageway 201, and passageway 200. The passageway 200, as aforedescribed, discharges into the tubular piston rod 115 to the atmosphere.

While fluid is bled from the cylinder 26 of the front duct gripping unit 21, so as to permit the spring 44 to urge the piston assembly 39 to the right, thereby releasing the cam member 45 from duct gripping engagement, fluid under pressure is admitted to the chamber 61 of the rear duct gripping unit 22 for forcing the piston assembly 75 and piston rod 74 to the left, as viewed in Figures 1, 1a, 2, and 2a, for disposing the cam member 81 into duct gripping engagement. Fluid under pressure is transmitted to the fluid passageway 190 in the valve block 112 from the fluid hose 67 in a manner which has been fully described hereinbefore. From the passageway 190 the fluid is directed to the chamber 61 of the rear duct gripping unit 22 through passageway 191, channel 179 in the main valve 177, passageways 195 and 193, tube 143 in the tubular piston rod 115, flexible sleeve 144, pipe stud 139, opening 137 in the front cap member 136 of the rear duct gripping unit 22, and the longitudinally extending fluid passageway 141 in the frame member 60. The fluid passageway 193 at its other end opens into the forward end of the main cylinder 97 and thus admits fluid under pressure therein when the main valve 177 is disposed at the right end of the opening 170 in the valve block 112.

Since the main piston assembly 96 is held stationary by means of the rear duct gripping unit 22, whose cam member 81 is in duct gripping engagement, the fluid under pressure admitted to the forward end of the main cylinder 97 forces the cylinder 97 and the forward duct gripping unit 21 to the left, as viewed in Figures 1, 1a, 2, and 2a. When the rear end of the cylinder 97 nears the rear end of the main piston assembly 96, the reduced end 217 of the pilot valve 186 engages the striker plate 161 of the dash pot member 160 and the valve 186 is shifted to the left to the position shown in Figure 25. This effects shifting of the main valve 177 also to the left, to the position shown in Figure 25, which places the chamber 61 of the rear duct gripping unit 22 and the front end of main cylinder 97 under bleed while causing a flow of fluid under pressure to the cylinder 26 of the front duct gripping unit 21 and the rear end of the main cylinder 97.

From the foregoing description, it will be realized that the duct rodding machine of our invention literally crawls inside of a duct or conduit. That is to say, while the main cylinder 97 is held stationary by means of the front duct gripping unit 21, the main piston assembly 96 and the rear duct gripping unit 22 are advanced forwardly. Upon the main piston assembly 96 reaching the end of its forward stroke, the main piston assembly 96 is held stationary by means of the rear duct gripping unit 22 and the main cylinder 97, and front duct gripping unit 21 are advanced forwardly. These cycles repeat themselves at approximately the rate of 80 cycles per minute, as long as fluid under pressure is supplied to the fluid hose 67.

Although it may appear from the above description of the construction and operation of the device of our present invention that it is very complicated, it is, on the contrary, a simple device of economical construction and one which is very effective in rodding a duct.

While we have shown and described what we believe to be a preferred embodiment of our present invention, it will be understood that various arrangements and modifications may be made therein without departing from the spirit and scope of our invention.

We claim:

1. A laterally flexible duct rodding machine, comprising a main fluid pressure operated reciprocating motor having two relatively movable parts, a pair of auxiliary pressure actuated means, one flexibly connected to each of said main motor parts whereby the longitudinal axes of said auxiliary pressure actuated means are free to move out of coincidence with the longitudinal axis of said main motor, and expansible duct gripping means actuated by said auxiliary pressure actuated means for gripping a duct at one end of the device when the main motor advances the other end of the device.

2. In a device of the class described, the combination of a main fluid pressure operated reciprocating motor having two relatively movable parts, a pair of duct gripping units one connected to each of said main motor parts, said duct gripping units each having expansible duct gripping means, auxiliary pressure actuated means for alternately expanding one of said duct gripping means while simultaneously retracting the other of said duct gripping means, and automatic valve means unitary with one of said main motor parts for controlling fluid pressure to said main motor and said auxiliary pressure actuated means.

3. A laterally flexible duct rodding machine, comprising a main fluid pressure operated reciprocating motor having two relatively movable parts, a pair of auxiliary pressure actuated motors, each flexibly connected to one of said main motor parts whereby the longitudinal axes of said auxiliary pressure actuated motors are free to move out of coincidence with the longitudinal axis of said main motor, expansible duct gripping means actuated by the auxiliary motors for gripping a duct at one end of the device when the main motor advances the other end of the device, and automatic valve means unitary with one of said main motor parts for controlling fluid pressure to said main and auxiliary motors.

4. In a laterally flexible duct rodding machine, the combination of a main fluid pressure operated reciprocating motor comprising a double ended cylinder and a piston therein adapted to be reciprocated in said cylinder, a pair of auxiliary pressure actuated motors, one flexibly connected to said cylinder and the other flexibly connected to said piston whereby the longitudinal axes of said auxiliary pressure actuated motors are free to move out of coincidence with the longitudinal axis of said main motor, automatic valve means disposed within said piston for controlling fluid pressure to said main and auxiliary motors, and expansible duct gripping means actuated by the auxiliary motors for gripping a duct at one end of the device when the main motor advances the other end of the device.

5. In a device of the class described, the combination of a main fluid pressure operated reciprocating motor comprising a double ended main cylinder and a piston therein adapted to be reciprocated in said cylinder, a pair of auxiliary pressure actuated motors disposed adjacent opposite ends of said main motor, one connected to said cylinder and the other connected to said piston, expansible duct gripping means each actuated alternately by the auxiliary motors, automatic valve means for controlling fluid pressure to said main and auxiliary motors, said valve means comprising a valve carried in said piston and adapted to be disposed in one of two positions, a first fluid passageway between said valve and one of said auxiliary motors and one end of said cylinder, a second fluid passageway between said valve and the other of said auxiliary motors and the other end of said cylinder, a fluid inlet terminating in said piston, said valve in the first position permitting fluid flow between said inlet and said first passageway and in the second position permitting fluid flow between said inlet and said second passageway, and means carried within said piston for controlling movement of said valve between said first and second positions.

6. In a device of the class described, the combination of a main fluid pressure operated reciprocating motor comprising a double ended main cylinder and a piston therein adapted to be reciprocated in said cylinder, a pair of auxiliary pressure actuated motors disposed adjacent opposite ends of said main motor, one connected to said cylinder and the other connected to said piston, expansible duct gripping means each actuated alternately by the auxiliary motors, automatic valve means for controlling fluid pressure to said main and auxiliary motors, said valve means comprising a rectilinearly movable valve carried in said piston and adapted to be disposed in one of two positions, a first fluid passageway between said valve and one of said auxiliary motors and one end of said cylinder, a second fluid passageway between said valve and the other of said auxiliary motors and the other end of said cylinder, a fluid inlet terminating in said piston, said valve in the first position permitting fluid flow between said inlet and said first passageway and in the second position permitting fluid flow between said inlet and said second passageway, and means carried within said piston for controlling movement of said valve between said first and second positions.

7. In a device of the class described, the combination of a main fluid pressure operated reciprocating motor comprising a double ended main cylinder and a piston therein adapted to be reciprocated in said cylinder, a pair of auxiliary pressure actuated motors disposed adjacent opposite ends of said main motor, one connected to said cylinder and the other connected to said piston, expansible duct gripping means each actuated alternately by the auxiliary motors, automatic valve means for controlling fluid pressure to said main and auxiliary motors, said valve means comprising a first cylindrical cavity within said piston, a rectilinearly movable valve in said cavity and adapted to be disposed in one of two positions, a first fluid passageway between said valve and one of said auxiliary motors and one end of said cylinder, a second fluid passageway between said valve and the other of said auxiliary motors and the other end of said cylinder, a fluid inlet terminating in said piston, said valve in the first position permitting fluid flow between said inlet and said first passageway and in the second position permitting fluid flow between said inlet and said second passageway, a second cylindrical cavity within said piston, a rectilinearly movable pilot valve in said cavity, said pilot valve having reduced end portions adapted to protrude outwardly through the ends of said piston, whereby said pilot valve is shifted when the reduced end portions thereof contact the adjacent ends of the main cylinder when said piston reciprocates in the latter, and said pilot valve having fluid connection with said first named valve for controlling movement thereof between said first and second positions.

8. In a laterally flexible duct rodding machine, the combination of a main fluid pressure operated reciprocating motor comprising a double ended cylinder and a piston therein adapted to be reciprocated in said cylinder, shock absorbing means in said cylinder adjacent each end thereof for absorbing the momentum of said piston when the latter is reciprocating, a pair of auxiliary pressure actuated motors, one flexibly connected to said cylinder and the other flexibly connected to said piston, automatic valve means disposed within said piston for controlling fluid pressure to said main and auxiliary motors, and expansible duct gripping means actuated by the auxiliary motors for gripping a duct at one end of the device when the main motor advances the other end of the device.

9. In the device of the class described, the combination of a main fluid pressure operated reciprocating motor having two relatively movable parts, a pair of duct gripping units one connected to each of said main motor parts, said duct gripping units each having expansible duct gripping means comprising an extensible cam, and auxiliary pressure actuated means for alternately extending each of said cams.

10. In a device of the class described, the combination of a main fluid pressure operated reciprocating motor having two relatively movable parts, a pair of duct gripping units one connected to each of said main motor parts, said duct gripping units each having expansible duct gripping means comprising an extensible cam, a pair of spaced lost motion connections for pivotally mounting each of said cams to said duct gripping units, and auxiliary pressure actuated means for alternately extending each of said cams.

11. In a device of the class described, the combination of a main fluid pressure operated reciprocating motor having two relatively movable parts, a pair of duct gripping units one connected to each of said main motor parts, said duct gripping units each having expansible duct gripping means comprising an extensible cam, auxiliary pressure actuated means for alternately extending each of said cams, and automatic valve means unitary with one of said main motor parts for controlling fluid pressure to said main motor and said auxiliary pressure actuated means.

12. In a device of the class described, the combination of a main fluid pressure operated reciprocating motor having two relatively movable parts, a pair of duct gripping units one connected to each of said main motor parts, said duct gripping units each having expansible duct gripping means comprising an extensible cam, a pair of spaced lost motion connections for pivotally mounting each of said cams to said duct gripping units, auxiliary pressure actuated means for alternately extending each of said cams and automatic valve means unitary with one of said main motor parts for controlling fluid pressure to said main motor and said auxiliary pressure actuated means.

13. In a laterally flexible duct rodding machine, the combination of a main fluid pressure operated reciprocating motor comprising a double ended main cylinder and a main piston therein adapted to be reciprocated in said cylinder, a pair of duct gripping units each having an auxiliary pressure actuated motor comprising a piston and cylinder, the cylinder of one of said auxiliary motors being flexibly connected to said main cylinder and the cylinder of the other of said auxiliary motors being flexibly connected to said main piston, said duct gripping units each having duct gripping means comprising an extensible cam, a first lost motion connection for pivotally mounting one each of said cams to each of said cylinders of said auxiliary motors, a second lost motion connection for pivotally mounting one each of said cams to each of said pistons of said auxiliary motors, said cams adapted to be extended alternately by said auxiliary motors, and automatic valve means for controlling fluid pressure to said main and auxiliary motors.

14. In a laterally flexible duct rodding machine, the combination of a main fluid pressure operated reciprocating motor comprising a double ended main cylinder and a main piston therein adapted to be reciprocated in said cylinder, a pair of duct gripping units each having an auxiliary pressure actuated motor comprising a piston and cylinder, the cylinder of one of said auxiliary motors being flexibly connected to said main cylinder and the cylinder of the other of said auxiliary motors being flexibly connected to said main piston, said duct gripping units each having duct gripping means comprising an extensible cam, a lost motion connection for pivotally mounting each of said cams to each of said cylinders of said auxiliary motors, a second lost motion connection for pivotally mounting one each of said cams to each of said pistons of said auxiliary motors, said cams adapted to be extended alternately by said auxiliary motors, automatic valve means for controlling fluid pressure to said main and auxiliary motors, said valve means comprising a first cylindrical cavity within said piston, a rectilinearly movable valve in said cavity and adapted to be disposed in one of two positions, a first fluid passageway between said valve and one of said auxiliary motors and one end of said cylinder, a second fluid passageway between said valve and the other of said auxiliary motors and the other end of said cylinder, a fluid inlet terminating in said piston, said valve in the first position permitting fluid flow between said inlet and said first passageway and in the second position permitting fluid flow between said inlet and said second passageway, a second cylindrical cavity within said piston, a rectilinearly movable pilot valve in said cavity, said pilot valve having reduced end portions adapted to protrude outwardly through the ends of said piston, whereby said pilot valve is shifted when the reduced end portions thereof contact the adjacent ends of the main cylinder when said piston reciprocates in the latter, and said pilot valve having fluid connection with said first named valve for controlling movement thereof between said first and second positions.

15. In a valve block having a first and second cavity therein, an inlet fluid passageway in communication with said first and second cavities, a first outlet fluid passageway in communication with said first and second cavities, a second outlet fluid passageway in communication with said second cavity, a third outlet fluid passageway in communication with said second cavity, a first fluid passageway between the intermediate portion of said first cavity and the one end of said second cavity, a second fluid passageway between the intermediate portion of said first cavity and the other end of said second cavity, a first valve disposed in said first cavity and adapted to be located in one of two positions, said first valve in the first position interconnecting said inlet fluid passageway with said second fluid passageway and said first fluid passageway with said first outlet fluid passageway, said first valve in the second position interconnecting said inlet fluid passageway with said first fluid passageway and said second fluid passageway with said first outlet fluid passageway, a second valve disposed in said second cavity and adapted to be located in one of two positions, said second valve in the first position interconnecting said inlet fluid passageway with said third outlet fluid passageway and said second outlet fluid passageway with said first outlet fluid passageway, and said second valve in the second position interconnecting said inlet fluid passageway with said second outlet fluid passageway and said third outlet fluid passageway with said first outlet fluid passageway.

16. In a valve block, a first and second cavity therein, a plurality of spaced apart grooves in the periphery of said first cavity, a plurality of spaced apart grooves in the periphery of said second cavity, an inlet fluid passageway in communication with one of said grooves in each of said first and second cavities, a first outlet fluid passageway in communication with one of said grooves in each of said first and second cavities, a second outlet fluid passageway in communication with one of said grooves in said second cavity, a third outlet fluid passageway in communication with one of said grooves in said second cavity, a first fluid passageway between one of said grooves in said first cavity and the one end of said second cavity, a second fluid passageway between one of said grooves in said first cavity and the other end of said second cavity, a first valve disposed in said first cavity and adapted to be located in one of two positions, said first valve in the first position interconnecting the grooves to which said inlet fluid passageway and said second fluid passageway communicate and interconnecting the grooves to which said first fluid passageway and said first outlet fluid passageway communicate, said first valve in the second position interconnecting the grooves to which said inlet fluid passageway and said first fluid passageway communicate and interconnecting the grooves to which said second fluid passageway and said first outlet fluid passageway communicate, a second valve disposed in said second cavity and adapted to be located in one of two positions, said second valve in the first position interconnecting the grooves to which said inlet fluid passageway and said third outlet fluid passageway communicate and interconnecting the grooves to which said second outlet fluid passageway and said first outlet fluid passageway communicate, and said second valve in the second position interconnecting the grooves to which said inlet fluid passageway and said second outlet fluid passageway communicate and interconnecting the grooves to which said third outlet fluid passageway and said first outlet fluid passageway communicate.

17. In a valve block, a first and second cavity therein; first, second, third, fourth, and fifth spaced apart grooves formed in the periphery of said first cavity; first, second, fourth, and fifth spaced apart grooves formed in the periphery of said second cavity; an inlet fluid passageway in communication with said third groove in said first outlet fluid passageway in communication with said first and fifth grooves in said first cavity and said second groove in said second cavity, a second outlet fluid passageway in communication with said first and fifth grooves in said second cavity, a third outlet fluid passageway in communication with said third groove in said second cavity, a first fluid passageway between said second groove in said first cavity and the one end of said second cavity, a second fluid passageway between said fourth groove in said first cavity and the other end of said second cavity, a first valve disposed in said first cavity and adapted to be located in one of two positions, said first valve in the first position interconnecting said first and second grooves and interconnecting said third and fourth grooves, said first valve in the second position interconnecting said second and third grooves and interconnecting said fourth and fifth grooves, a second valve disposed in said second cavity and adapted to be located in one of two positions, said second valve in the first position interconnecting said first and second grooves and interconnecting said third and fourth grooves, and said second valve in the second position interconnecting said second and third grooves and interconnecting said fourth and fifth grooves.

18. In a valve assembly comprising a valve and first and second end members, a first cylindrical cavity extending longitudinally within said valve block on an axis lying above the horizontal median plane of the latter at one side of the vertical median plane thereof, a second cylindrical cavity extending longitudinally within said valve block on an axis lying in the vertical median plane of the latter below the horizontal median plane thereof; first, second, third, fourth, and fifth spaced apart annular grooves formed in the periphery of said first cavity; first, second, third, fourth, and fifth spaced apart annular grooves formed in the periphery of said second cavity; an inlet fluid passageway extending longitudinally within said valve block on an axis lying in the horizontal median plane of the latter on the same side of the vertical median plane thereof as the first cylindrical cavity, a first diagonal fluid passageway in a transverse plane of said valve block for interconnecting said inlet fluid passageway and said fourth annular groove in said second cavity, a second diagonal fluid passageway parallel to said first diagonal fluid passageway for interconnecting said inlet fluid passageway and said third annular groove in said first cavity, a first outlet fluid passageway extending longitudinally on an axis lying in the vertical median plane of said valve block above the horizontal median plane thereof, a third diagonal fluid passageway in a transverse plane of said valve block interconnecting said first outlet fluid passageway and said first annular groove of said first cavity, a fourth diagonal fluid passageway parallel to said third diagonal fluid passageway for interconnecting said first outlet fluid passageway and said fifth annular groove in said first cavity, a fifth diagonal fluid passageway parallel to said third and fourth diagonal fluid passageways for interconnecting said first outlet fluid passageway and said second annular groove in said second cavity, a second outlet fluid passageway extending longitudinally on an axis lying in the horizontal median plane of the valve block on the opposite side of the vertical median plane as said first cavity, a sixth diagonal fluid passageway parallel to said fifth diagonal fluid passageway for interconnecting said second outlet fluid passageway and said first annular groove in said second cavity, a seventh diagonal fluid passageway parallel to said sixth diagonal fluid passageway for interconnecting said second outlet fluid passageway and said fifth annular groove in said second cavity, a third outlet fluid passageway extending longitudinally on an axis lying below the horizontal median plane of the valve block on the same side of the vertical median plane thereof as said second outlet fluid passageway, an eighth diagonal fluid passageway parallel to said seventh diagonal fluid passageway for interconnecting said third outlet fluid passageway and said third annular groove in said second cavity, first and second coaxially aligned intermediate fluid passageways opening into the opposite ends of said valve block on an axis lying below the horizontal median plane of the latter on the same side of the vertical median plane thereof as said first cavity, a ninth diagonal fluid passageway parallel to said eighth diagonal fluid passageway for interconnecting said first intermediate fluid passageway and said second annular groove in said first cavity, a tenth diagonal fluid passageway parallel to said ninth diagonal fluid passageway for interconnecting said second intermediate fluid passageway and said fourth annular groove in said first cavity, a first channel in said first end member for interconnecting said first intermediate fluid passageway and the one end of said second cavity, a second channel in said second end member for interconnecting said second intermediate fluid passageway and the other end of said second cavity, a first valve disposed in said first cavity and adapted to be located in one of two positions, said first valve in the first position interconnecting said first and second grooves and interconnecting said third and fourth grooves, said first valve in the second position interconnecting said second and third grooves and interconnecting said fourth and fifth grooves, a second valve disposed in said second cavity and adapted to be located in one of two positions, said second valve in the first position interconnecting said first and second grooves and interconnecting said third and fourth grooves, and said second valve in the second position interconnecting said second and third grooves and interconnecting said fourth and fifth grooves.

CRONJE JASPER.
GEORGE T. HAWK.

REFERENCES CITED

The following references are of record in the file of this patent:

UNITED STATES PATENTS

| Number | Name | Date |
|---|---|---|
| 273,295 | Lytle | Mar. 6, 1883 |
| 1,128,746 | Bierce | Feb. 16, 1915 |
| 1,620,788 | Thompson | Mar. 15, 1927 |
| 1,675,738 | Titcomb | July 3, 1928 |
| 1,862,591 | Fisher | June 14, 1932 |